(No Model.)

L. WARREN.
SPRING SEAT FOR VEHICLES.

No. 295,963. Patented Apr. 1, 1884.

Witnesses:
A. Ruppert
Louis Marceron

Inventor:
Lewis Warren
by Nottingham & Suggett
Attys.

UNITED STATES PATENT OFFICE.

LEWIS WARREN, OF McGRAWVILLE, NEW YORK.

SPRING-SEAT FOR VEHICLES.

SPECIFICATION forming part of Letters Patent No. 295,963, dated April 1, 1884.

Application filed December 15, 1883. (No model.)

*To all whom it may concern:*

Be it known that I, LEWIS WARREN, a citizen of the United States, residing at McGrawville, in the county of Cortland and State of New York, have invented certain new and useful Improvements in Spring-Seats for Vehicles, of which the following is a specification, reference being had therein to the accompanying drawings.

My invention relates to improvements in spring-seats for vehicles, more particularly to that class called "running wagons;" and the novelty consists in the construction and arrangement of the various parts, as will be more fully hereinafter set forth, and specifically pointed out in the claim.

The object of the invention is to provide such a formation and arrangement of seat-springs and concomitant parts thereof as shall be efficient in service, simple, and cheap in construction; and to this end the invention consists, essentially, of the mechanism fully illustrated in the accompanying drawings, in which—

Figure 1:
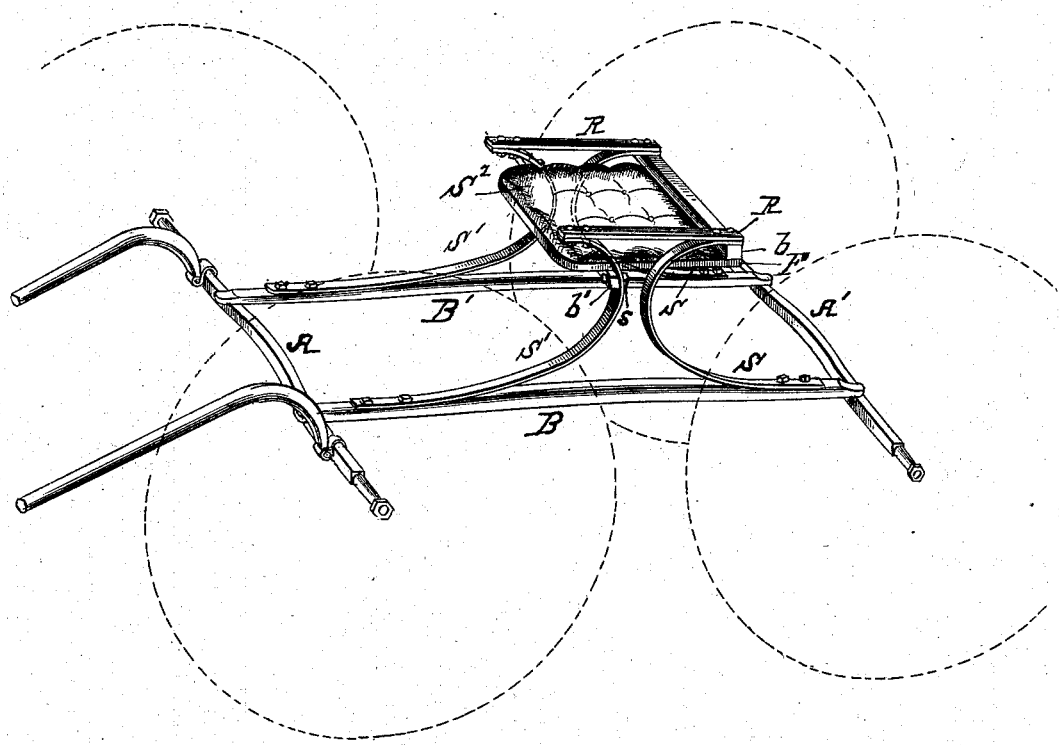
Figure 2:
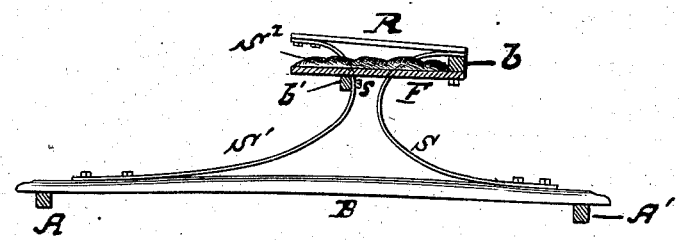

Figure 1 represents a perspective view of my invention as applied to the running-gear of a wagon, and Fig. 2 a vertical sectional view.

Referring to the drawings, in which similar letters of reference indicate like parts in all the figures, the letters A and A' indicate, respectively, the forward and rear axles, while B and B' indicate the side bars used in the ordinary side-bar vehicles. Bolted to each rear end of said side bar is one end of a spring, S, which, curving upward and over similar in form to the letter C, has its other end secured between the side rail, R, and cross-bar $b$.

Similar-shaped springs S', curved reverse to springs S, have one end secured to each of the forward ends of the side bars, and the other end to the forward end of each of the side rails, R. These springs may be made of any suitable material; but I prefer to make them of wood, as being cheaper, and in some respects better adapted to vehicles of this class than metal. A cross-bar, $b'$, is bolted at each end to each of the forward springs, S', as shown at $s$. $S^2$ indicates the seat, which is hung between the side springs, and the rear portion of its frame F is secured to the cross-bar $b$, while its forward part of the frame rests upon the cross-bar $b'$.

My improved spring-seat, in connection with the side bars, affords an easy, springy motion, and the whole presents an attractive and neat appearance.

I am aware that seats have heretofore been supported on C-springs, and such is not sought to be covered in this application.

What I claim as new is—

The combination, with the side bars of a vehicle and the side bars of a seat thereof, of the curved wooden springs S S', their lower ends being secured to the side bars, arranged in reverse directions in the line of travel, and their upper ends being secured to the side bars, $b$ and $b'$, of seat $S^2$, as and for the purposes specified.

In testimony whereof I affix my signature in presence of two witnesses.

LEWIS WARREN.

Witnesses:
JOHN W. SUGGETT,
JOHN IRELAND.